Dec. 14, 1965 W. P. GINGRAS 3,222,786

READER FOR SUPERIMPOSABLE CARD SYSTEM

Filed Sept. 18, 1962

INVENTOR:
WILLIAM P. GINGRAS

BY Homer R. Montague
ATTORNEY

United States Patent Office 3,222,786
Patented Dec. 14, 1965

3,222,786
READER FOR SUPERIMPOSABLE CARD SYSTEM
William P. Gingras, Rockville, Md., assignor to Jonker Business Machines, Inc., a corporation of Delaware
Filed Sept. 18, 1962, Ser. No. 224,903
2 Claims. (Cl. 33—76)

This invention pertains to information retrieval systems, based on superimposition of cards dedicated to characteristics. Systems of this nature are known as peek-a-boo systems. Commercially they are known as Termatrex systems.

The present invention concerns an improved reader for use with these systems. It provides faster operation, and better readability.

The invention will now be explained with reference to the following figures.

Figures 1, 2, 3:
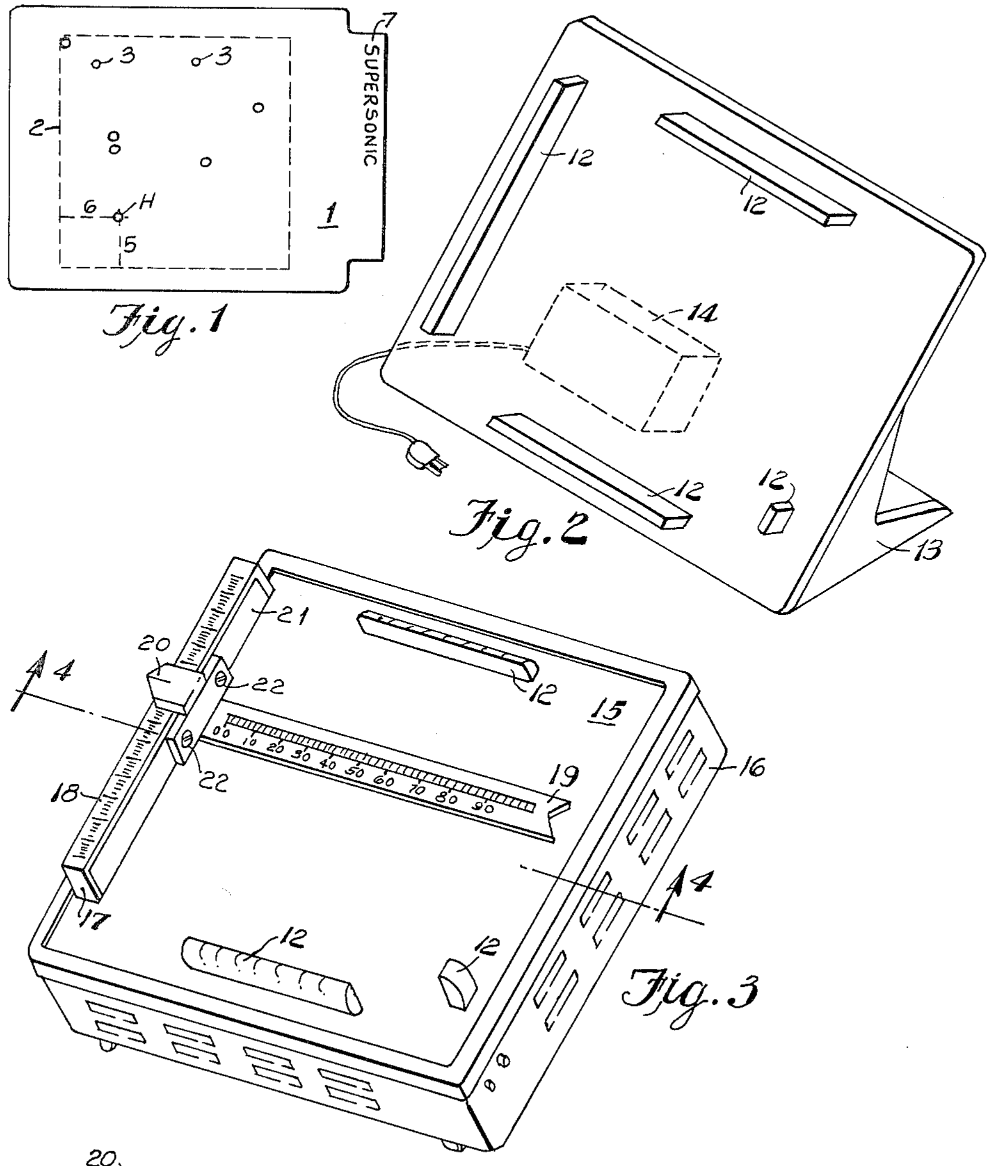
FIG. 1 shows a typical card.
FIG. 2 shows a perspective view of a reader according to the invention.
FIGS. 3 and 4 show two cross-sectional views of another embodiment of the invention.

A superimposable card search system comprises as many cards as there are terms in the vocabulary of terms used in the system. Vocabularies vary between 50 and 5000 terms. Normally a document is indexed by 5 to 25 of these terms. FIG. 1 shows a card dedicated to the term "supersonic." Each of the holes 3 in the card one represents a document indexed by the term supersonic. If in this area 2, a total of 10,000 positions for holes are contained in a pattern of 100×100, holes can be identified by their coordinates and there can be a direct relationship between the serial numbers of the documents and their coordinates. For example if the coordinates of hole H, 6 and 5, are respectively 25 and 17, hole H represents document # 1725.

In searching a system of this nature, a number of cards are superimposed, preferably in a lightbox and the serial numbers of coinciding holes are read off by means of a fixed ruler along the Y axis and a slideable ruler along the X axis.

Figure 4:
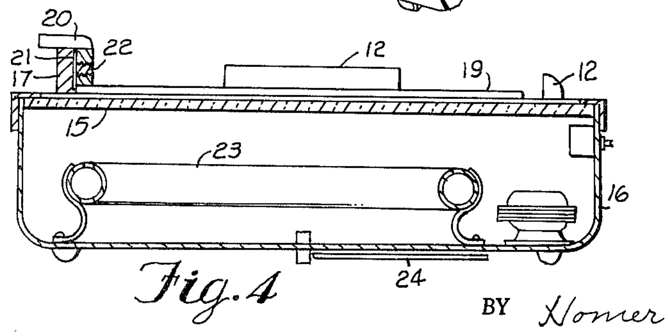

The invention concerns improvements in this ruler arrangement. FIG. 2 shows an example of a lightbox, comprising an electroluminescent plate 11, a power supply 14 for the same, card alignment blocks 12, and supports 13. FIGS. 3 and 4 show a lightbox comprising a fluorescent tube 23 placed in an enclosure 16. The top plate 15 is translucent.

The readout is performed by means of the stationary part 17, having a scale 18 on top and a strip of ferrous material 21 along its side. The movable ruler 19 is preferably made of transparent plastic. It has two permanent magnets 22. Each of them is adjustable. This can be accomplished by threading the ruler and screwing the magnets into the plastic. Thus the ruler 19 can be easily removed and replaced regardless of how many cards are superimposed under it. The ruler can also slide up and down while held against the metal.

It is of course also possible to make the strip 21 or the entire part 17 a magnet and make the parts 22 ferrous metal pieces.

The above represents only examples of embodiments of the invention. Its full scope is contained in the accompanying claims.

What is claimed is:

1. An illuminated reader for inspection of perforated data cards, comprising a lightbox including an illuminated front surface panel, data-card positioning formations on said panel, an elongated guide bar secured to said panel and extending parallel to and adjacent one edge thereof, one side surface of said bar being of ferromagnetic material, a sliding scale member having a scale portion extending across said panel and a second portion positioned against said side surface of said guide bar, and a pair of permanent magnets adjustably threaded through said second portion to present their ends against said ferromagnetic surface, said magnets being spaced from one another in the direction of the length of said guide bar.

2. An illuminated reader in accordance with claim 1, including cooperating scale indicia carried by said guide bar and said second portion of said member.

References Cited by the Examiner

UNITED STATES PATENTS

| | | | |
|---|---|---|---|
| 1,642,232 | 9/1927 | Edwards | 33—76 |
| 2,015,368 | 9/1935 | Ryan. | |
| 2,048,221 | 7/1936 | Redding | 33—76 |
| 3,096,458 | 7/1963 | Demmy | 240—2.25 |

ISAAC LISANN, *Primary Examiner.*